(12) United States Patent
Miller et al.

(10) Patent No.: US 6,249,731 B1
(45) Date of Patent: Jun. 19, 2001

(54) METHOD FOR THE MANIPULATION-PROOF CONFIGURATION OF A VEHICLE CONTROL UNIT, AND A CONTROL UNIT

(75) Inventors: Norbert Miller, Abstatt; Klaus Walter, Bietigheim-Bissingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,352

(22) PCT Filed: May 13, 1998

(86) PCT No.: PCT/DE98/01325

§ 371 Date: Oct. 4, 1999

§ 102(e) Date: Oct. 4, 1999

(87) PCT Pub. No.: WO98/51538

PCT Pub. Date: Nov. 19, 1998

(30) Foreign Application Priority Data

May 15, 1997 (DE) .............................. 197 20 285

(51) Int. Cl.[7] .................................. G05B 19/403
(52) U.S. Cl. .................. 701/48; 340/52 F; 340/459; 371/29; 371/62; 307/38; 307/31; 307/32
(58) Field of Search ........................ 701/48; 364/431.77; 318/603; 340/52 F

(56) References Cited

U.S. PATENT DOCUMENTS

| 4,584,487 | * | 4/1986 | Hesse et al. ........................ 307/10 R |
| 4,682,294 | * | 7/1987 | Duc et al. ............................. 364/492 |
| 4,804,937 | * | 2/1989 | Barbiaux et al. ................... 340/52 F |
| 4,843,557 | * | 6/1989 | Ina et al. ......................... 364/431.77 |
| 5,247,234 | * | 9/1993 | Bitzer et al. ......................... 318/603 |
| 5,278,547 |   | 1/1994 | Suman ............................. 340/825.32 |

FOREIGN PATENT DOCUMENTS

| 36 24 456 A1 |   | 7/1986 | (DE) . |
| 40 12 003 A1 |   | 4/1990 | (DE) . |
| 3624456 | * | 11/1994 | (DE) . |
| 0 376 983 B1 |   | 10/1988 | (EP) . |
| 0 376 983 |   | 7/1990 | (EP) . |
| 0 392 411 |   | 10/1990 | (EP) . |
| 2232272 | * | 5/1990 | (GB) . |
| WO 89 04785 |   | 6/1989 | (WO) . |

* cited by examiner

Primary Examiner—William A. Cuchlinski, Jr.
Assistant Examiner—Tuan C To
(74) Attorney, Agent, or Firm—Kenyon & Kenyon

(57) ABSTRACT

An engine control unit for a vehicle control unit arrangement is preconfigured to perform a plurality of functions and configures its own range of functions by activating selected preconfigured functions as well as a method for the manipulation-proof configuration of the engine control unit. To activate a preconfigured function, the engine control unit issues a signal for detecting the presence of component control units connected to it. It then requests an item of information for activating a function preconfigured in the control unit from a component control unit that was detected. After receiving an item of activation information, it activates the corresponding preconfigured function.

13 Claims, 2 Drawing Sheets

METHOD FOR THE MANIPULATION-PROOF CONFIGURATION OF A VEHICLE CONTROL UNIT, AND A CONTROL UNIT

FIELD OF THE INVENTION

The present invention relates to a control unit and a method for the manipulation-proof configuration of a vehicle control unit.

BACKGROUND INFORMATION

A control unit is described in European Patent No. 376983 which is preconfigured for performing a plurality of functions and which, after being installed in the vehicle for the first time, is configured according to the functions needed in the vehicle in response to an activation command. Unneeded functions remain inactive. The control unit can be used as a universal control unit for a wide variety of vehicle types. However, the basic fact that available, yet non-activated, functions are provided generally makes it possible for unauthorized personnel to expand the original range of functions supplied by the manufacturer and, for example, to use components that are not approved by the manufacturer. All that is needed to do this is to manipulate the non-volatile memory in which the valid control unit configuration is stored.

SUMMARY OF THE INVENTION

An object of the present invention is to provide a control unit as well as a method for configuring a control unit arrangement which provides better protection against unauthorized modification of a configuration once the latter has been defined.

By providing at least one further component in the vehicle in addition to the vehicle control unit in order to activate a preconfigured function, the control unit according to the present invention makes an unauthorized change of a defined configuration much more difficult because at least two vehicle elements must now be manipulated in a coordinated manner. An immobilizer, i.e., a control unit which prevents the vehicle from being driven away, which is usually provided, in any case, in new vehicles, is especially suitable as the component for storing information to activate functions preconfigured in the control unit. Functions that are suitable for providing protection according to the present invention include, for example, cruise control and anti-spin control. It is advantageous to store a configuration only upon receiving an acknowledgment signal to be entered from the outside, thereby enabling test operation of the vehicle or the control unit arrangement.

DETAILED DESCRIPTION

Figure 1:
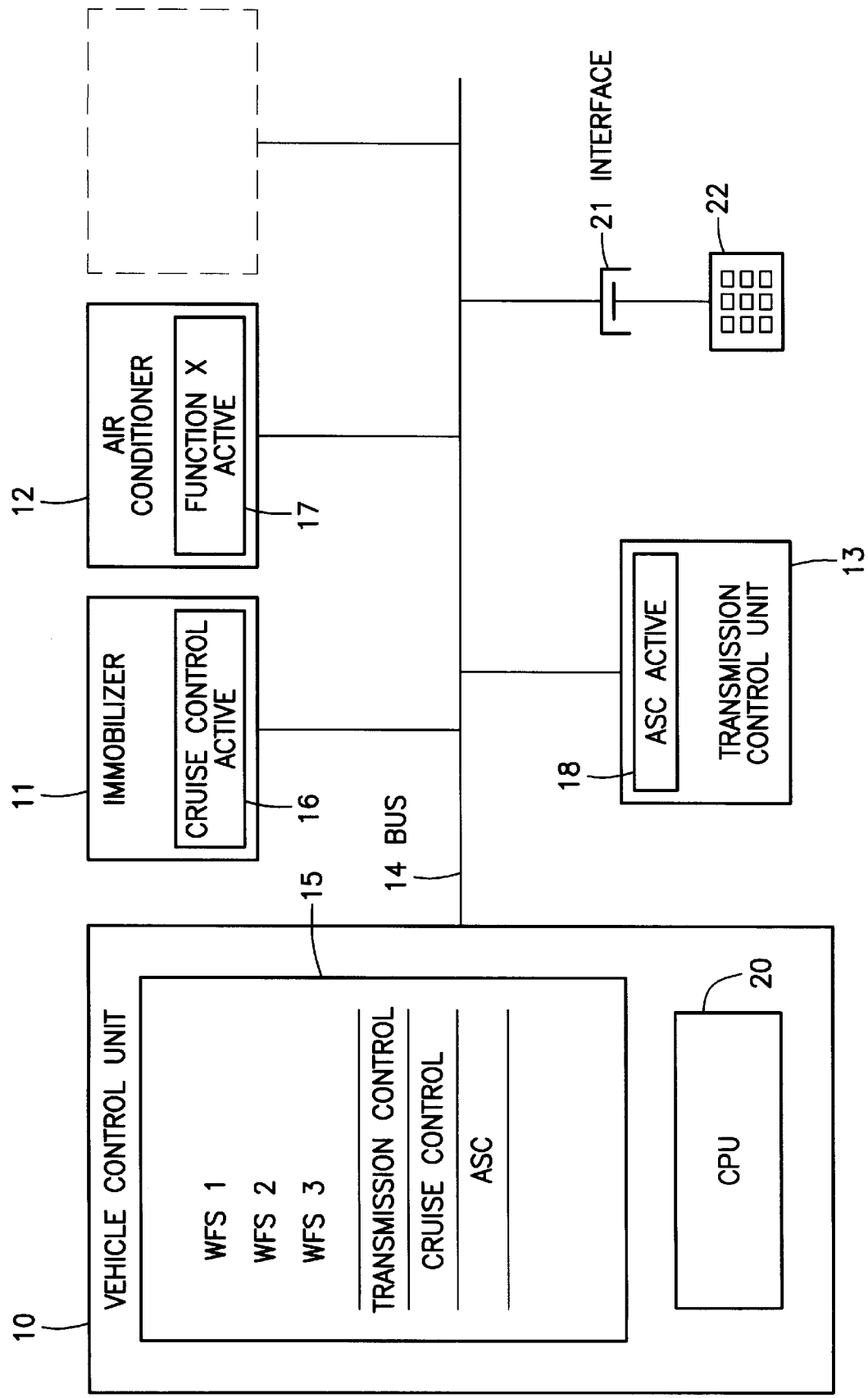
FIG. 1 shows a block diagram of a vehicle control unit arrangement according to the present invention.

FIG. 1 shows a vehicle control unit 10, referred to below as an engine control unit, which is connected via a bus, such as a CAN bus, to further component control units present in the vehicle, such as an immobilizer 11, an antilock brake control unit, an air-conditioner control unit 12, or an intelligent transmission control unit 13. Control units of this type can also be components which do not perform an actual controlling function, such as a radio. Engine control unit 10 has a central processing unit 20 for performing the vehicle functions implemented by engine control unit 10 as well as a memory 15 in which the functions are stored in the form of digital information. In addition to indispensable operating functions, in particular, those needed for controlling the engine itself, memory 15 also contains a directory of control units 11, 12, 13 connected via bus 14, as well as a wide variety of optional preconfigured functions which are activated depending on the special design of the vehicle in which control unit 10 is installed. Such optional functions include for example an immobilizer, a cruise control device, or an anti-spin control device. Different versions of each of these functions can be provided. In the case of immobilizer functions, for example, versions contemplated by the present invention include, for example, a vehicle without an immobilizer, a vehicle with an immobilizer and a model-specific code, or a vehicle with an immobilizer and a vehicle-specific code. Likewise, cruise control versions with different characteristics can also be provided. Furthermore, an optional function can be used to activate a component control unit connected to the bus. The above-mentioned examples of preconfigured functions do not constitute a complete list, and any other functions and groups of functions can be provided. In addition, each of the preconfigured functions is assigned a location in memory 15 where information can be entered, indicating whether a function was activated and, if the function involves the connection of an additional component to bus 14, whether the component is present.

Each component control unit 11, 12, and 13 connected to engine control unit 10 also has a central processing unit (which is not illustrated in the interest of clarity) as well as a memory 16, 17, 18. In each memory one item of information is entered which can be used to activate an optional function provided in engine control unit 10. For example, memory 16 of immobilizer 11 can contain an item of information which is used to activate the optional preconfigured cruise control function in engine control unit 10, as shown in FIG. 1. Or memory 18 of transmission control unit 13 can contain an item of information which can be used to activate the preconfigured anti-spin control (ASC) function. Likewise, memory 17 of air-conditioner control unit 12 can contain an item of information for activating a further optional function "X". Bus 14 has an interface 21 for connecting an external device 22 which can be used by an authorized person to access memories 15, 16, 17, 18, with access being protected by a code.

Figure 2:
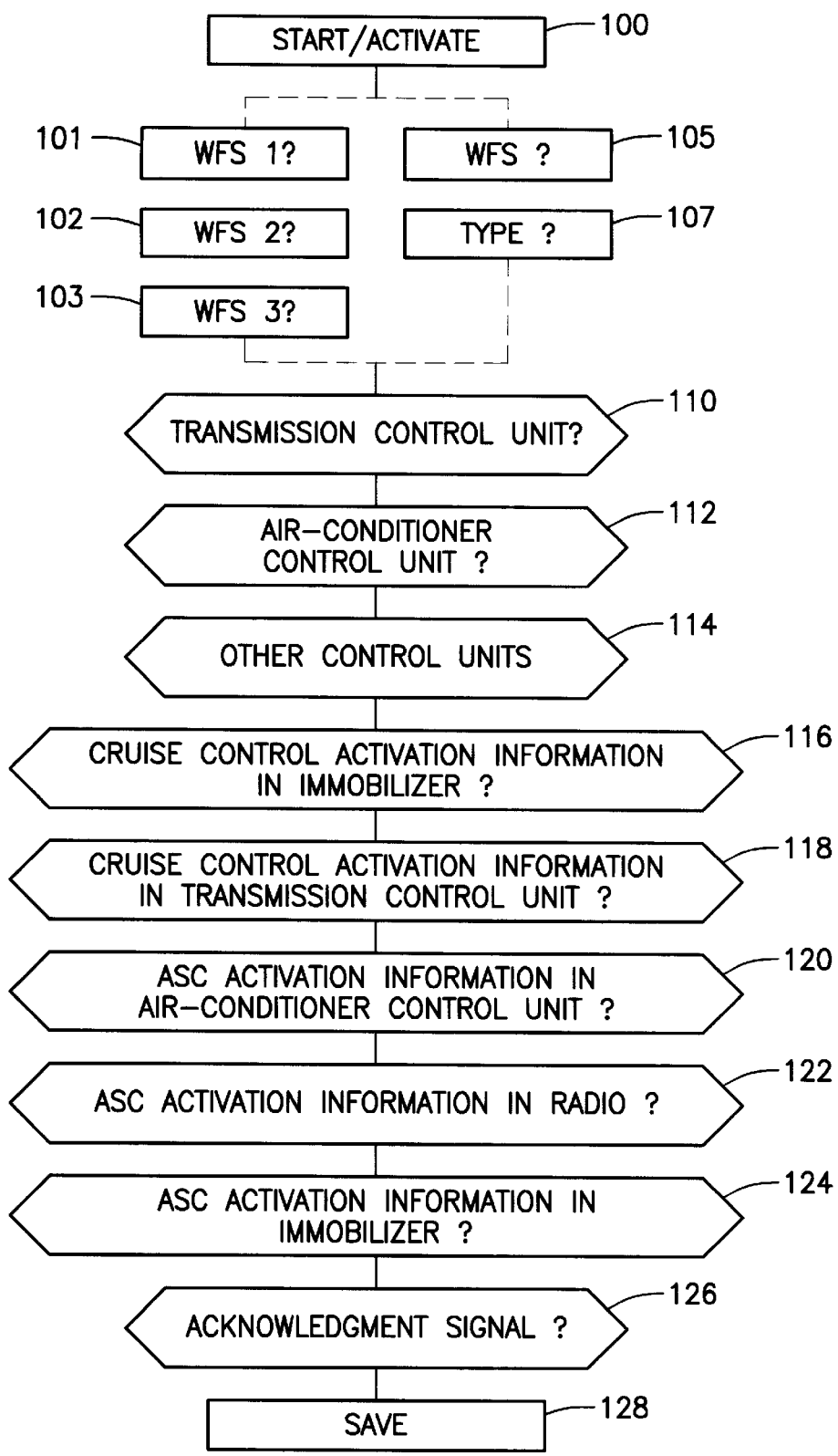
FIG. 2 shows a flowchart of a configuration operation according to the present invention.

The flowchart in FIG. 2 illustrates one possible means according to the present invention of operating the arrangement shown in FIG. 1. After complete control unit configurations 10, 11, 12, 13 have been installed in the vehicle, the configuration operation is initiated by a start command, which is suitably supplied by an operator via interface 21 (step 100). Engine control unit 10 subsequently checks whether an immobilizer function should be activated. To do this, it sends a command to establish the presence of an immobilizer 11 based on the first preconfigured immobilizer type (WFS 1) to bus 14 (step 101). If a positive response is not received, i.e., if first immobilize type WFS 1 is not present, engine control unit 10 checks whether an immobilizer of second type 2 (WFS 2) is available. If necessary, it continues and checks the remaining preconfigured immobilizer types (step 103). If an interrogation signal is met with a positive response, engine control unit 10 sets a flag, indicating that an immobilizer 11 of the correct type is present in memory 15.

Engine control unit 10 then checks the presence of the next component control unit on bus 14, e.g., a transmission control unit 13 (step 110). It follows the same procedure used in determining the presence of an immobilizer. In the same manner, engine control unit 10 subsequently checks the presence of all further control units that can be connected to control unit 10 (steps 112, 114). It flags any detected control units 12, 13 in memory 15.

After determining all component control units connected to bus 14, engine control unit 10 checks which of the optional preconfigured functions should actually be activated. To do this, it sends a request signal relating to the first optional function entered in memory 15, e.g., the cruise control function, to a first of the detected control units, e.g., immobilizer 11, prompting the latter to send an item of information for activating the optional function back to engine control unit 10 (step 116). The control unit to which the request signal is sent is determined by the preconfigured function. If the interrogated control unit, e.g., immobilizer 11, contains an item of activation information and sends this information back to engine control unit 10, the latter activates the function involved, i.e., the cruise control function.

Instead of storing an item of activation information in a component control unit permanently assigned to the optional function, i.e., cruise control activation in immobilizer 11, it is also contemplated by the present invention to store this information in one of multiple control units, for example, either in immobilizer 11 or in transmission control unit 13. In this case, engine control unit 10 checks whether a certain item of activation information is present in another detected control unit when it receives a negative response from the first component control unit checked. For example, it checks whether an item of information for activating the cruise control function is present in transmission control unit 13 if this information is not stored in immobilizer 11 (step 118).

In the same manner as described above for the cruise control function, engine control unit 10 subsequently checks whether items of activation information exist for the further functions preconfigured in control unit 10. For example, it checks air-conditioner control unit 12 to see whether an item of activation information exists for the preconfigured ASC function (step 120) and, if this check is negative and the information can be stored in another component control unit, it subsequently checks whether the corresponding activation information is present in a different component control unit (step 122).

Multiple items of information for activating different functions preconfigured in engine control unit 10 can also be stored in the same control unit, for example, in immobilizer 11 (step 124).

Engine control unit 10 flags all preconfigured functions in memory 15 for which it detects the presence of activation information, thus activating these functions. The control unit configuration that is fully defined after checking all preconfigured functions is subsequently protected so that it cannot be deleted (step 128). To do this, an acknowledgment signal is entered from external operator console 22 (step 126). Alternatively, storage of the configuration can be triggered by the presence of a specific component control unit. When the configuration is permanently recorded, the configuration stored in memory 15 is suitably displayed on external operator console 22.

The configuration operation carried out upon initial startup can be repeated during subsequent routine operation of the vehicle at the specific request of a user or on a regular basis with the goal of verification. If this action reveals a variance from the configuration stored in memory 15, an error message or further actions limiting vehicle operation can be provided. This makes it possible to determine, for example, whether a control unit 11, 12, 13 containing an item of activation information has been replaced by an unauthorized control unit which does not contain any activation information.

As an alternative to the individual checks described above to determine the presence of the corresponding component control units (steps 101 through 103), component control units 11, 12, 13 can inform engine control unit 10 directly of their types in response to a test signal (step 107). For example, immobilizer 11 responds by sending type Information WFS 1, WFS 2, etc. In addition, the procedure described above does not have to be carried out solely under the control of engine control unit 10. It can be transferred in the same manner to any other component control unit as well as to other groups of control units and intelligent components located in a vehicle.

What is claimed is:

1. A method for configuring a control unit in a control unit arrangement, the control unit arrangement including at least two control units, the at least two control units including a vehicle control unit and a component control unit, the at least two control units being interconnected, the vehicle control unit being preconfigured for performing a plurality of functions of which at least one is activated by an item of activation information, the method comprising the steps of:

storing in the component control unit the item of activation information corresponding to a preconfigured function of the plurality of functions preconfigured in the vehicle control unit;

determining whether the corresponding item of activation information is stored in the component control unit by triggering a request to be sent from the vehicle control unit to the component control unit; and activating the preconfigured function in the vehicle control unit upon receipt by the vehicle control unit of the corresponding item of activation information.

2. A control unit arrangement, comprising:

at least two control units, the at least two control units including a vehicle control unit and a component control unit, the at least two control units being interconnected, the vehicle control unit being preconfigured for performing a plurality of functions of which at least one is activated by an item of activation information, wherein the item of activation information corresponding to a preconfigured function of the plurality of functions preconfigured in the vehicle control unit is stored in the component control unit, wherein whether the corresponding item of activation information is stored in the component control unit is determined by triggering a request to be sent from the vehicle control unit to the component control unit, and wherein the preconfigured function in the vehicle control unit is activated upon receipt by the vehicle control unit of the corresponding item of activation information.

3. The control unit arrangement according to claim 2, wherein the vehicle control unit includes a range of functions, the range of functions being automatically configured by activating selected preconfigured functions of the plurality of functions.

4. The control unit arrangement according to claim 2, wherein the preconfigured function includes a cruise control function.

5. The control unit arrangement according to claim 2, wherein the preconfigured function includes an anti-slip control function.

6. The control unit arrangement according to claim 2, wherein the preconfigured function includes an activation of the component control unit.

7. The control unit arrangement according to claim 2, wherein, upon receiving an external acknowledgment signal, the vehicle control unit permanently stores the activated preconfigured function and a configuration of the at least two control units.

8. The control unit arrangement according to claim 2, wherein the preconfigured function includes a plurality of preconfigured functions with corresponding items of activation information.

9. The control unit arrangement according to claim 2, wherein, upon detecting a presence of a predetermined component control unit, the vehicle control unit permanently stores the activated preconfigured function and a configuration of the at least two control units.

10. The control unit arrangement according to claim 2, wherein the vehicle control unit is part of a vehicle and wherein the vehicle control unit includes a range of functions, the range of functions being automatically configured by activating selected preconfigured functions of the plurality of functions, the vehicle control unit configuring repeatedly the range of functions at regular intervals during routine operation of the vehicle.

11. The control unit arrangement according to claim 10, wherein the vehicle control unit limits an operation of the vehicle if a difference develops between a first range detected and a second range detected.

12. The control unit arrangement according to claim 2, wherein the component control unit is an immobilizer.

13. The control unit arrangement according to claim 10, wherein the vehicle control unit limits an operation of the vehicle if a difference develops between a first range detected and a second range detected, wherein the first range is detected earlier than the detection of the second range.

* * * * *